United States Patent [19]

Quintal

[11] 4,106,555
[45] Aug. 15, 1978

[54] GROUND HEAT EXCHANGER

[76] Inventor: Yvan Quintal, 12,663 Fortin St., Montreal North, Canada

[21] Appl. No.: 734,738

[22] Filed: Oct. 21, 1976

[51] Int. Cl.² ............................................. F28D 15/00
[52] U.S. Cl. ......................................... 165/45; 165/85
[58] Field of Search ................ 165/45, 117, 118, 119, 165/170, 171, 185, 164, 1; 126/400

[56] References Cited

U.S. PATENT DOCUMENTS

| 2,513,373 | 7/1950 | Sporn et al. | 165/45 X |
| 2,805,557 | 9/1957 | Hilger | 165/170 |
| 3,586,102 | 6/1971 | Gilles | 165/185 |
| 3,616,835 | 11/1971 | Lavrenty | 165/117 |

FOREIGN PATENT DOCUMENTS 2,445,281  8/1976  Fed. Rep. of Germany ............. 165/45

*Primary Examiner*—Charles J. Myhre
*Assistant Examiner*—Theophil W. Streule, Jr.

[57] ABSTRACT

A ground heat exchanger adapted to be buried in the ground and to be used in association with a heat pump system for heating and cooling. The exchanger includes a heat conducting metal plate adapted to be vertically buried in the ground and carrying a fluid circulating coil adapted to be connected to the circuit of the heat pump system. The ends of the plate are each movably inserted into a corresponding slit of an upright tube filled with a heat conducting grease. Weights compress the grease within the tubes and cause its ejection through apertures of the tubes along both surfaces of the plate, so as to fill any voids between the plate and the ground and to also fill any new voids which may develop due to contraction of expansion of the plate with temperature variation and also due to ground movement. The top ends of the tubes are accessible above ground surface, so that they may be refilled according to need. The elimination of air pockets or voids maintains the entire surfaces of the plate in contact with the ground, whereby the heat exchange efficiency is maintained even after a long period of use. The thermal grease also prevents rusting of the plate surfaces which might impair its heat conductivity.

7 Claims, 7 Drawing Figures

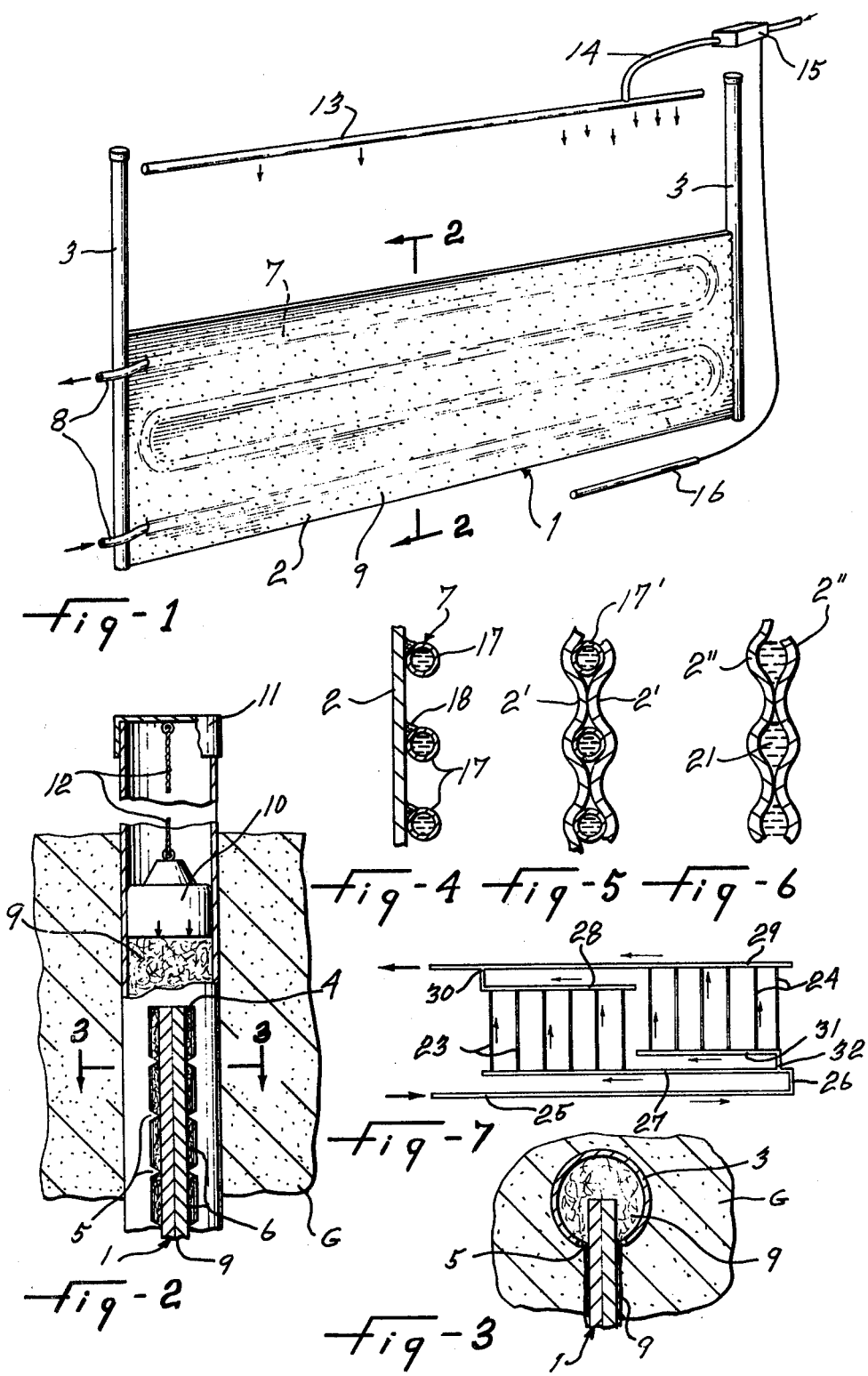

GROUND HEAT EXCHANGER

The present invention relates to a ground heat exchanger and, more particularly, to such an exchanger adapted to be used in combination with a heat pump system for heating and cooling of enclosed spaces, such as homes and other buildings.

The use of the earth as a substantially constant temperature heat reservoir for heat exchange purposes is well known. The use of the earth in heat exchange relation with a heat pump system including a compressor, a condenser, an expansion valve and an evaporator, with the evaporator in the form of a heat exchanger buried in the ground, is also well known. Such a heat pump system is described, for instance, in U.S. Pat. No. 2,513,373 dated July 4, 1950. However, in order to remain efficient, a ground heat exchanger, obviously, must remain in constant and firm contact with the ground so that the latter may act as an efficient heat sink or as an efficient source of heat. However, using the same heat exchanger in winter-time to collect heat from the ground at a low temperature and as a heat disposal unit in summer-time to disperse heat in the ground, results in considerable variations in the operating temperature of the heat exchanger and, consequently, results in expansion and contraction of the same. Furthermore, especially in Northern climates, ground, upon freezing and defreezing, moves appreciably within the span of just one year. Therefore, a ground heat exchanger buried in the ground rapidly loses its heat exchange efficiency due to the creation of voids or air pockets between the heat exchanger surfaces and the adjacent earth. These heat exchangers are normally made of steel for low cost and good heat conductivity. However, steel rusts quite quickly in the ground. Painting of the steel surfaces, naturally, decreases the heat conductivity at the interface with the earth.

It is therefore the general object of the invention to provide a ground heat exchanger of the character described, which will obviate the above-noted disadvantages in that it retains its heat conducting relationship with the earth in which it is buried for a very long time and despite repeated contraction and expansion and also ground movement.

Another object of the invention is to provide a ground heat exchanger of the character described having means to automatically fill with a heat conducting medium any voids or air pockets developing between the ground and heat exchanger surfaces.

Another object of the invention is to provide a ground heat exchanger of the character described, having means for the simple replenishing of the heat conducting medium.

Another object of the invention is the provision of a heat exchanger of the character described, in which the void filling heat conducting medium is a thermal grease which coats the heat exchanger surfaces and prevents its rusting.

The foregoing and other objects of the invention will become more apparent during the following disclosure and by referring to the drawings, in which:

FIG. 1 is a perspective view of the assembly of the heat exchanger unit of the invention;

FIG. 2 is a partial cross-section, taken along line 2—2 of FIG. 1;

FIG. 3 is a partial plan section, taken along line 3—3 of FIG. 2;

FIGS. 4, 5, and 6 are partial cross-sections of the heat exchanger plate and coil in accordance with three different embodiments; and FIG. 7 is a plan view of a preferred arrangement of the fluid circulating coil which is part of the heat exchanger plate of the invention.

In the drawings, like reference characters indicate like elements throughout.

The ground heat exchanger in accordance with the invention is generally indicated at 1 and comprises an elongated rectangular flat metal plate 2 and a pair of upright end tubes 3, each having a vertically extending slit 4 in the region of its lower end portion. The slit 4 has substantially the height of the plate 2 and receives the end of the plate, so that the latter extends within the tube 3, as shown in FIG. 3. Slit 4 has at intervals a plurality of inwardly extending fingers 5 equally spaced along the length of each edge of the slit and slidably engaging the opposite surfaces of the plate 2. Slit 4 between the fingers 5 defines apertures 6 on each side of the plate 2, the apertures being in communication with the inside of the tube 3. The plate 2 between tubes 3 carries a fluid circulating coil 7 extending over the entire surface of the plate and connected at its ends 8, into the circuit of a heat pump used as a heating and/or cooling system for a house or the like. Each tube 3 is filled with a flowable heat conducting medium 9, which is maintained under constant pressure within the tube 3 by means of a weight 10 freely slidable within the tube 3 and resting on top of the medium 9.

The pressure exerted by the weight 10 is sufficient to extrude the medium 9 through apertures 6 along the plate surfaces. Plate 2 is adapted to be buried in the ground G in a vertical plane with the upright tubes 3 extending above the top edge of the plate to terminate at the ground surface. Its open end is normally closed by a removable cap 11 to which a rope, or cable 12, is attached and loosely extends within the tube 3 to be attached at its lower end to the weight 10. Thus, the weight can be removed from the tube and the tube refilled with the thermal medium 9, whenever desired. The bottom end of each tube 3 is closed.

Medium 9 is preferably a grease, such as lubricating grease used in cars, containing a heat-conducting metal in powdered form. The grease may be a silicone grease, such as the silicone grease manufactured by Dow Chemicals Limited, and containing copper oxide in powdered form dispersed throughout the grease. This is a so-called thermal grease or heat-conducting grease, which has a coefficient of heat conductivity K of 0.43, as compared to the normal earth conductivity of 0.02 to 1.4. The K factor above mentioned is designed in term of BTU transmitted per square foot surface area per inch thickness.

Before burying the plate 2, both its surfaces are entirely coated with the thermal grease and, once buried, the tubes 3 are filled with a thermal grease. During use, any air pocket which develops between the plate and the earth is quickly filled with the pressurized thermal grease being extruded through the apertures 6 of the tubes 3 and the grease moving along both faces of the plate to fill the voids or air pockets.

It has been calculated that an air space of only $\frac{1}{8}$ of an inch separating the plate surface from the earth will reduce the heat exchange efficiency of the heat exchanger at least five times. For instance, a heat exchanger normally designed to exchange 100,000 BTUs will thus only have 20,000 BTUs per hour.

It has been found that, even after only 6 months' operation, such air pockets are formed over substantially the entire plate surfaces. This is due to ground movement with freezing and defreezing and with the variation in the operating temperature of the heat exchanger which is as much as 100° F. between winter and summer operation. Under this temperature variation, the plate 2 can expand and contract to a total amount of ½ inch over a length of about 24 feet, which is the length necessary for this plate to have, supposing a 3 feet width, to handle the heat exchange load of a heating pump designed to heat and cool a normal size house. This contraction and expansion is simply taken care of by the plate moving out into the end upright tubes 3.

The thermal grease, naturally, also protects the plate against oxidation and eliminates another heat exchange barrier, the plate being normally made of copper or an alloy of aluminum and zinc.

In summer-time, heat dries the earth and, thus, it may be necessary, as is known, to wet the earth surface in the region of the heat exchanger, for instance by means of a perforated water spinkler tube 13 connected to a water supply by a pipe 14, in turn provided with an electro valve 15 automatically controlled by a humidity responsive transducer 16 buried in the ground. Whenever the earth is too dry, the pipe 14 will discharge water to wet the earth around the heat exchanger 1. In winter-time, the humidity of the earth migrates towards the plate 2 and no such watering is needed.

The fluid medium circulating coil 7, the fluid medium being for instance Freon, as commonly used in refrigerating system can take different forms, as shown in FIGS. 4, 5, and 6. The coil 7 may consist simply in a pipe 17, of copper, aluminum or the like, or steel, directly welded to one side of the plate 2 as by welding 18.

As an alternative, a pipe 17', formed as a coil, can be sandwiched between two half plates 2' spot-welded together between the pipes and bent to form a corrugated cross-section, as shown in FIG. 5.

As another alternative, the pipes could have helicoidal fins inside the tube, to increase the heat transfer between the fluid and the plate.

As a further alternative, the pipes 17 or 17' are completely eliminated and two half plates 2", of corrugated cross section, are juxtaposed and spot-welded together, leaving passage 20 for the heat exchange fluid 21.

The coil can have any desired path, for instance a simple zigzag path, as shown in FIG. 1; but it is preferred to design the coil so as to have the path shown in FIG. 7, including two sets of parallel paths, so connected that substantially equal fluid flow will occur in each set and also in each leg of the set, the system being so arranged that substantially the same length of flow in each path and, consequently, the same resistance to flow is encountered in each path.

More specificably, there are two sets of parallel tubes and 24 respectively, disposed side by side, along the length of the plate 2. The tubes of both sets are of equal length. The common inlet tube 25 is bent back at 26 into a U to form a leg 27 which acts as a manifold for the tubes 23 of the first set. These tubes discharge in a common outlet manifold 28, which forms a branch parallel to the outlet common tube 29 and communicates therewith at 30.

The arrangement of the second set of tubes 24 is reversed namely: the inlet manifold 31 forms a side branch of the common inlet tube 25 and is parallel to the leg 27 thereof and communicates therewith at 32 at one end of the inlet manifold 31, while the pipes 24 have their outlet in direct communication with the common outlet tube 29.

The arrangement is such that the path through anyone of the tubes 23 and 24 is equal, starting from the common inlet point 32 to the common outlet point 30. Obviously, the diameters of the tubes 23 and 24 are the same and the diameter of the leg 27, outlet tube 29, outlet manifold 28 and inlet manifold 31 is also the same.

From the foregoing arrangement, a parallel path system is obtained for increased fluid flow and, at the same time, the flow rate in each tube 23 and 24 is substantially the same for uniform heat exchange efficiency over the entire surfaces of the plate 2.

I claim:

1. A ground heat exchanger operatively comprising a plate of heat-conducting material having a pair of opposite lateral edges and carrying a fluid circulating coil arranged in heat-conducting relation therewith, a pair of tubes each having a longitudinal slit extending through the wall thereof, and each having one of said opposite lateral edges of the plate slidably engaged therein, the walls of said tubes providing apertures communicating the interior of said tubes with the opposite outer surfaces of the plate, and a flowable heat-conducting material operatively contained in said tubes and outwardly flowable under pressure through said apertures against the opposite outer surfaces of said plate and filling spaces and gaps eventually occurring between said plate and the surrounding ground.

2. A ground heat exchanger as claimed in claim 1, wherein pressure means are provided to maintain said flowable heat-conducting material under pressure.

3. A ground heat exchanger as claimed in claim 2, wherein said means include a weight freely resting on top of said material within said tube.

4. A heat exchanger as claimed in claim 1, wherein said tubes extend at substantially right angles to and have one end located above one of the longitudinal edges of said plate, said tubes being open at said one end.

5. A heat exchanger as claimed in claim 4, wherein said tubes are upright and open at their top end, further including a weight in each tube, freely resting on top of the material in the tube, a cap removably closing said top end and rope means attaching said cap to said weight.

6. A ground heat exchanger as claimed in claim 1, wherein each slit is wider than the thickness of said plate at the end portion of said plate entering said tube, the slit edges forming inwardly and oppositely directed fingers slidable engaging said plate end portion, said apertures being defined by the portions of said slit between said fingers.

7. A ground heat exchanger operatively comprising an elongated heat exchanger plate adapted to be disposed in a vertical plane within the ground, a pair of upright tubes each having an upper end portion outwardly extending relative to the ground and a lower end portion provided with a longitudinal lateral slit extending through the wall thereof, slidably receiving an associated end of the plate, and allowing shifting of the plate in the corresponding slit with respect to the tubes upon contraction and expansion of the plate, each slit forming apertures communicating the inside of the tube with the opposite outer surfaces of said plate, a fluid circulating coil carried by said plate and extending substantially co-extensive and in heatconducting relation with said plate, a thermally conducting and flowable grease-like material contained in said upright tubes, and pressure means in the upper end portion of said upright tubes urging the material in said tubes toward outward flow through said apertures against said opposite outer surfaces to fill spaces and gaps eventually produced at the interfaces of said plate and ground upon contraction and expansion of the plate.

* * * * *